(12) United States Patent
Woolmer et al.

(10) Patent No.: US 12,040,668 B2
(45) Date of Patent: Jul. 16, 2024

(54) STATOR FOR AXIAL FLUX MACHINE

(71) Applicant: YASA LIMITED, Kidlington (GB)

(72) Inventors: Tim Woolmer, Waterperry (GB); Tom Hillman, Oxford (GB)

(73) Assignee: YASA LIMITED, Kidlington (GB)

( * ) Notice: Subject to any disclaimer, the term of this patent is extended or adjusted under 35 U.S.C. 154(b) by 278 days.

(21) Appl. No.: 17/610,323

(22) PCT Filed: May 11, 2020

(86) PCT No.: PCT/EP2020/063024
§ 371 (c)(1),
(2) Date: Nov. 10, 2021

(87) PCT Pub. No.: WO2020/229399
PCT Pub. Date: Nov. 19, 2020

(65) Prior Publication Data
US 2022/0247291 A1 Aug. 4, 2022

(30) Foreign Application Priority Data

May 10, 2019 (GB) ..................................... 1906644

(51) Int. Cl.
*H02K 21/24* (2006.01)
*H02K 1/2798* (2022.01)
(Continued)

(52) U.S. Cl.
CPC .......... *H02K 21/24* (2013.01); *H02K 1/2798* (2022.01); *H02K 3/28* (2013.01); *H02K 5/203* (2021.01)

(58) Field of Classification Search
CPC ...... H02K 21/24; H02K 5/203; H02K 1/2798; H02K 3/28
(Continued)

(56) References Cited

U.S. PATENT DOCUMENTS 5,801,473 A 9/1998 Helwig
2006/0152104 A1 7/2006 Hino et al.
(Continued)

FOREIGN PATENT DOCUMENTS

GB 2511925 A 9/2014
JP H0522919 A 1/1993
(Continued)

OTHER PUBLICATIONS

European Patent Office (ISA/EP). International Search Report and Written Opinion, issued in Application No. PCT/EP2020/063024 on Jul. 31, 2020. 12 pages.
(Continued)

*Primary Examiner* — Terrance L Kenerly
(74) *Attorney, Agent, or Firm* — Meunier Carlin & Curfman LLC

(57) ABSTRACT

A stator having a plurality of stator bars disposed circumferentially at intervals around an axis is provided. Each of the stator bars has a set of windings wound therearound for generating a magnetic field generally parallel to the axis. A plurality of radially outwardly disposed electrical interconnects for connecting two or more windings together are provided radially outwardly of the plurality of stator bars and extending circumferentially along at least a portion of the outer periphery of the stator bars. A plurality of radially inwardly disposed electrical interconnects for connecting two or more windings together are also provided radially inwardly of the stator bars and extending circumferentially along at least a portion of the inner periphery of the stator bars. The outer periphery of the stator is devoid of radially outwardly disposed interconnects along one or more portions.

30 Claims, 11 Drawing Sheets

(51) Int. Cl.
*H02K 3/28* (2006.01)
*H02K 5/20* (2006.01)

(58) Field of Classification Search
USPC ........................................................ 310/40 R
See application file for complete search history.

(56) References Cited

U.S. PATENT DOCUMENTS

2007/0046140 A1  3/2007  Shibukawa et al.
2009/0200890 A1  8/2009  Halstead

FOREIGN PATENT DOCUMENTS

| JP | H10174399 A | | 6/1998 | |
| JP | 2002119022 A | | 4/2002 | |
| JP | 2003124019 | * | 4/2003 | ........... H02K 1/2766 |
| JP | 2004080922 A | | 3/2004 | |
| JP | 2006191782 A | | 7/2006 | |
| WO | WO2009100436 | * | 8/2009 | ............... H02K 3/28 |
| WO | 2012/022974 A1 | | 2/2012 | |
| WO | WO2012022974 | * | 2/2012 | ............ H02K 21/24 |
| WO | 2015/124922 A1 | | 8/2015 | |

OTHER PUBLICATIONS

UK Intellectual Property Office. Combined Search and Examination Report, issued in Application No. GB1906644.8 on Jul. 14, 2021. 3 pages.
Chinese Office Action, in connection to CN2020800350920, dated Oct. 17, 2023.
Office Action in connection to JP Application No. 2021-564782, dated Feb. 6, 2024.

* cited by examiner

STATOR FOR AXIAL FLUX MACHINE

CROSS-REFERENCE TO RELATED APPLICATIONS

This application is a national stage application filed under 35 U.S.C. § 371 of PCT/EP2020/063024 filed May 11, 2020, which claims priority to and benefit of GB Application No. 1906644.8, filed May 10, 2019, the content of which is incorporated by reference in its entirety.

FIELD OF THE INVENTION

This invention relates to the construction of electrical machines, in particular stators used for axial flux electric machines used as motors and generators.

BACKGROUND OF THE INVENTION

There is a need to improve the power density of electric machines such as motors and generators. One reason for this is the increasing focus on electrically driven vehicles, including land vehicles and aircraft. However the volume available for power source, transmission and ancillary components is limited and a variety of factors including power storage puts further pressure on designers to increase power density of electric machines for space and performance gains.

Improving power density of electric machines has often been directed towards one or more of cooling methods, motor topology and materials usually to enable higher ampere turns. Though these approaches have seen significant advances, there remains a strong incentive to further improve power density. Particularly for axial flux, segmented armature formats increasing a machine's power rating raises additional problems because the interior of these machines is already designed for high power operation, often reliant on effective liquid coolant flow. Any redesign must retain effective cooling whilst accommodating changes to increase power density.

One type of axial flux segmented armature machine is the yokeless and segmented armature (YASA) machine. Typical YASA machines are difficult to cool because they lack a stator yoke through which heat can be conducted away from the stator. Prior art machines have immersed stator coils in flowing liquid coolant contained within a stator housing, significantly increasing heat dissipation and hence power delivery. GB2511925 discloses an additional improved cooling feature for machines of the YASA type. Liquid coolant is circulated around a chamber in which it can not only contact electrical stator coils of the machine, but also the coil face and pole shoes thereby improving heat dissipation from key components and improving power density.

We have therefore appreciated a need for an improved motor construction that enables a greater power density within the machine form factor.

SUMMARY OF THE INVENTION

The present invention therefore provides a stator for an axial flux machine and an axial flux machine in accordance with the independent claims appended hereto. Further advantageous embodiments are also provided by the dependent claims, appended hereto.

The present invention provides a stator for an axial flux machine, comprising: a plurality of stator bars disposed circumferentially at intervals around an axis, each of the stator bars having a set of windings wound therearound for generating a magnetic field generally parallel to the axis, the plurality of stator bars being arranged to provide a hollow region at the centre of the axis, the stator bars having an outer periphery facing away from the axis and an inner periphery facing towards the axis; and a plurality of radially outwardly disposed electrical interconnects for connecting two or more windings together, the plurality of radially outwardly disposed electrical interconnects being disposed radially outwardly of the plurality of stator bars and extending circumferentially along at least a portion of the outer periphery of the stator bars; a plurality of radially inwardly disposed electrical interconnects for connecting two or more windings together, the plurality of radially inwardly disposed electrical interconnects being disposed radially inwardly of the stator bars and extending circumferentially along at least a portion of the inner periphery of the stator bars, wherein the outer periphery of the stator is devoid of radially outwardly disposed interconnects along one or more portions.

Such an arrangement offers a number of advantages. When the stator is enclosed within a housing, for a given size of a housing, the stator coils and poles on which they are wound may be increased in size, expanding into the region free of outwardly disposed interconnect wiring and thereby increasing the machine's maximum power output. Therefore, such a machine using such a stator would have a higher power output compared to a machine using a conventional stator of the same size.

Furthermore, instead of a housing retaining the same shape as above, a portion of such a housing, corresponding with the region of the stator devoid of outwardly disposed interconnects, may be flattened to reduce the out dimension of the housing. Such an arrangement advantageously provides for a stator that is diametrically smaller than the equivalently sized stator. As such, a machine using such a stator could be smaller than a machine using a conventional stator since the size of the stator bars and windings has not changed.

The radially inwardly portion of the stator, corresponding to the one or more portions devoid of radially outwardly disposed interconnects, may comprise radially inwardly disposed electrical interconnects.

The stator may comprise one or more electrical transitions between the radially inwardly and radially outwardly electrical interconnects. Each of the one or more transitions between the radially inwardly and radially outwardly electrical interconnects may occur via a respective winding.

Using the windings themselves for the transitions between inner and outer electrical interconnects obviates the need for additional bus bars to effect the transitions. Such bus bars would likely add additional unnecessary radial dimensions to the stator.

Each set of windings may comprise a single layer of windings over the stator bar, the layer of windings comprising a ribbon-shaped wire having a greater width across a surface of the ribbon-shaped wire than thickness through the ribbon-shaped wire; wherein the windings are stacked along the stator bar in a direction that is generally orthogonal to the axis such that adjacent ribbon-shaped wire surfaces of said ribbon-shaped wire abut one another.

The windings of the stator bars may be electrically connected in a 3-phase star arrangement, although other arrangements such as delta or delta-star may instead be possible, along with other arrangements know in the field of electrical machines.

The stator may comprise a stator housing enclosing the stator bars, the stator housing having annular side walls at either end of the stator bars and an inner and outer circumferential sides respectively radially inwardly and radially outwardly of the stator bars. One or more portions of the stator housing corresponding with the respective one or more portions of the outer periphery of the stator that is devoid of radially outwardly disposed interconnects may have a dimension between the outer circumferential side and the stator bar that is smaller than a dimension between the outer circumferential side and stator bar at a region of the stator comprising radially outwardly disposed interconnects.

Such an arrangement of the stator housing advantageously provides for a stator having a reduced radial dimension compared to conventional stators, enabling smaller machines to be provided without compromising on the power output of such a machine.

The stator housing may define a chamber incorporating a cooling fluid, the stator housing including a port for supply and a port for drainage of the cooling fluid. The housing and stator bars may be arranged to permit the cooling fluid to flow back and forth between the inner and outer radius of the stator bars. The stator may comprise one or more blocks disposed in the stator housing between the stator housing and one or more respective stator bars, wherein the cooling fluid is forced through gaps between the stator bars by means of the blocks.

The outer circumferential side of the stator housing may abut one or more stator bars in the regions of the stator corresponding with the respective one or more portions of the outer periphery of the stator that is devoid of radially outwardly disposed interconnects, the abutment blocking flow of the cooling liquid between the housing and the stator bar and causing the cooling fluid to be forced between adjacent stator bars.

The above stator may comprise two portions devoid of radially outwardly disposed interconnects. These two portions devoid of radially outwardly disposed interconnects may be circumferentially opposite one another.

The present invention also provides an axial flux machine, comprising: a stator comprising a plurality of stator bars disposed circumferentially at intervals around an axis, each of the stator bars having a set of windings wound therearound for generating a magnetic field generally parallel to the axis, the plurality of stator bars being arranged to provide a hollow region at the centre of the axis, the stator bars having an outer periphery facing away from the axis and an inner periphery facing towards the axis; a rotor comprising a set of permanent magnets and mounted for rotation about the axis of the machine, the rotor being spaced apart from the stator along the axis of the machine to define a gap between the stator and rotor, wherein the stator comprises: a plurality of radially outwardly disposed electrical interconnects for connecting two or more windings together, the plurality of radially outwardly disposed electrical interconnects being disposed radially outwardly of the plurality of stator bars and extending circumferentially along at least a portion of the outer periphery of the stator bars; and a plurality of radially inwardly disposed electrical interconnects for connecting two or more windings together, the plurality of radially inwardly disposed electrical interconnects being disposed radially inwardly of the stator bars and extending circumferentially along at least a portion of the inner periphery of the stator bars, and wherein the stator is devoid of radially outwardly disposed interconnects along one or more portions.

As discussed above, such an arrangement offers a number of advantages. When the stator is enclosed within a housing, for a given size of a housing, the stator coils and poles on which they are wound may be increased in size, expanding into the region free of outwardly disposed interconnect wiring and thereby increasing the machine's maximum power output. Therefore, such a machine using such a stator would have a higher power output compared to a machine using a conventional stator of the same size.

Furthermore, instead of a housing retaining the same shape as above, a portion of such a housing, corresponding with the region of the stator devoid of outwardly disposed interconnects, may be flattened to reduce the out dimension of the housing.

Such an arrangement advantageously provides for a stator that is diametrically smaller than the equivalently sized stator. As such, the machine using such a stator could be smaller than a machine using a conventional stator since the size of the stator bars and windings has not changed.

The radially inwardly portion of the stator, corresponding to the one or more portions devoid of radially outwardly disposed interconnects, may comprise radially inwardly disposed electrical interconnects.

The stator of the machine may comprise one or more electrical transitions between the radially inwardly and radially outwardly electrical interconnects. Each of the one or more transitions between the radially inwardly and radially outwardly electrical interconnects may occur via a respective winding.

Each set of windings may comprise a single layer of windings over the stator bar, the layer of windings comprising a ribbon-shaped wire having a greater width across a surface of the ribbon-shaped wire than thickness through the ribbon-shaped wire; wherein the windings are stacked along the stator bar in a direction that is generally orthogonal to the axis such that adjacent ribbon-shaped wire surfaces of said ribbon-shaped wire abut one another.

The windings of the stator bars are electrically connected in a 3-phase star arrangement, although other arrangements such as delta or delta-star may instead be possible, along with other arrangements know in the field of electrical machines.

The machine may comprise a stator housing enclosing the stator bars, the stator housing having annular side walls at either end of the stator bars between the stator and the rotor and an inner and outer circumferential sides respectively radially inwardly and radially outwardly of the stator bars. One or more portions of the stator housing corresponding with the respective one or more portions of the outer periphery of the stator that is devoid of radially outwardly disposed interconnects may have a dimension between the outer circumferential side and the stator bar that is smaller than a dimension between the outer circumferential side and stator bar at a region of the stator comprising radially outwardly disposed interconnects.

The housing may define a chamber incorporating a cooling fluid, the stator housing including a port for supply and a port for drainage of the cooling fluid. The housing and stator bars may be arranged to permit the cooling fluid to flow back and forth between the inner and outer radius of the stator bars.

The stator may comprise one or more blocks disposed in the stator housing between the stator housing and one or more respective stator bars, wherein the cooling fluid is forced through gaps between the stator bars by means of the blocks. The outer circumferential side of the housing may abut one or more stator bars in the regions of the stator corresponding with the respective one or more portions of the outer periphery of the stator that is devoid of radially outwardly disposed interconnects, the abutment blocking flow of the cooling liquid between the housing and the stator bar and causing the cooling fluid to be forced between adjacent stator bars.

The machine may comprise a second rotor comprising a set of permanent magnets and mounted for rotation about the axis of the machine, the second rotor being spaced apart from the stator along the axis of the machine to define a gap between the stator and second rotor, and the second rotor being disposed on a side of the stator opposed to the rotor.

The machine may comprise two portions devoid of radially outwardly disposed interconnects. The two portions devoid of radially outwardly disposed interconnects may be circumferentially opposite one another.

In any of the above, the machine may be a motor or a generator.

LIST OF FIGURES

The present invention will now be described, by way of example only, and with reference to the accompanying figures, in which.

DETAILED DESCRIPTION OF THE PREFERRED EMBODIMENTS

Figure 1A:
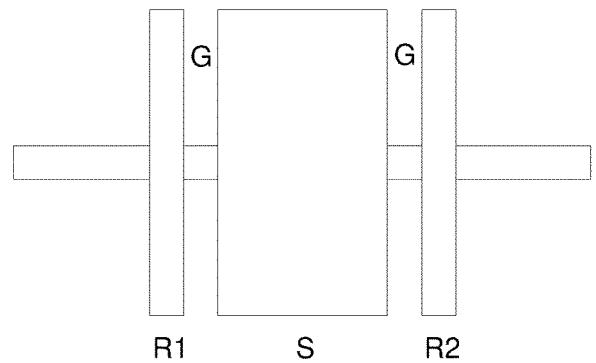
FIGS. 1a to 1c show, respectively, a general configuration of a two-rotor axial flux machine, example topologies for axial flux permanent magnet machines, and a schematic side view of a yokeless and segmented armature (YASA) machine.
Figure 1B:
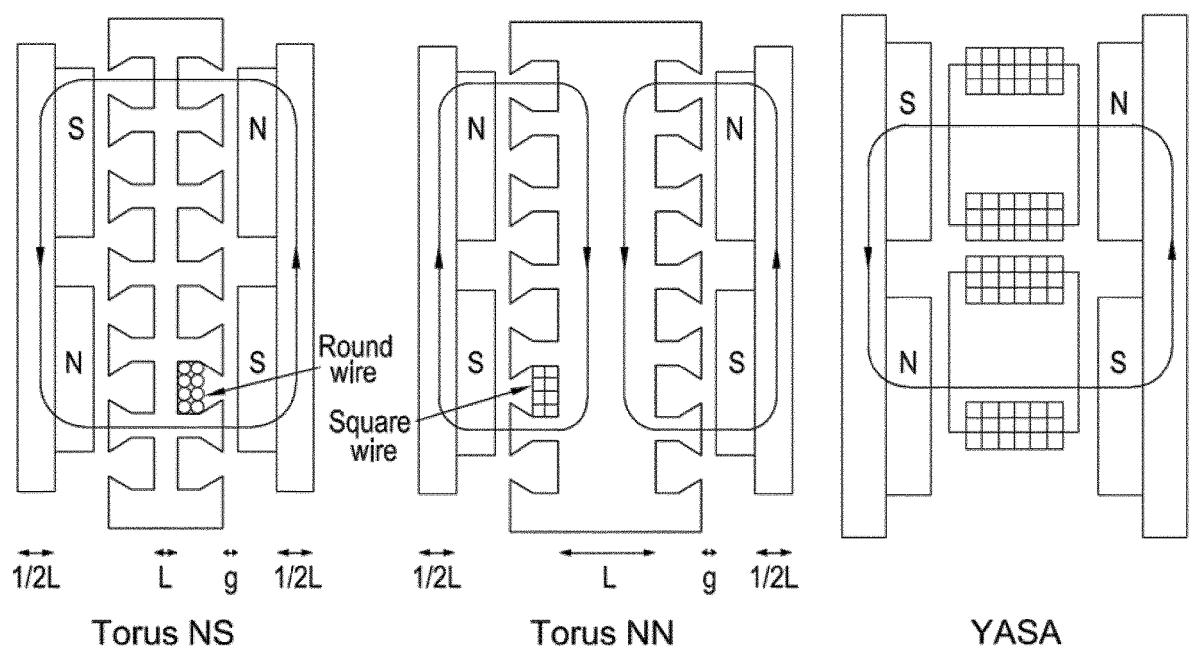
Figure 1C:
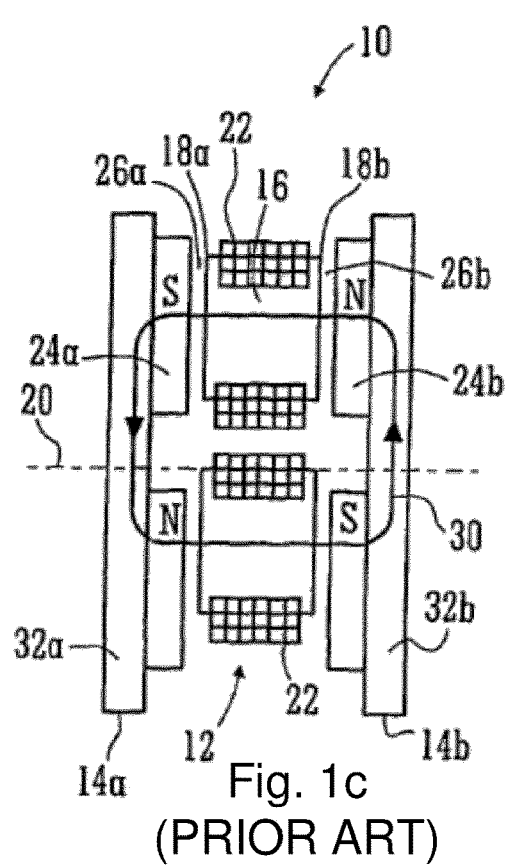
Figure 2:
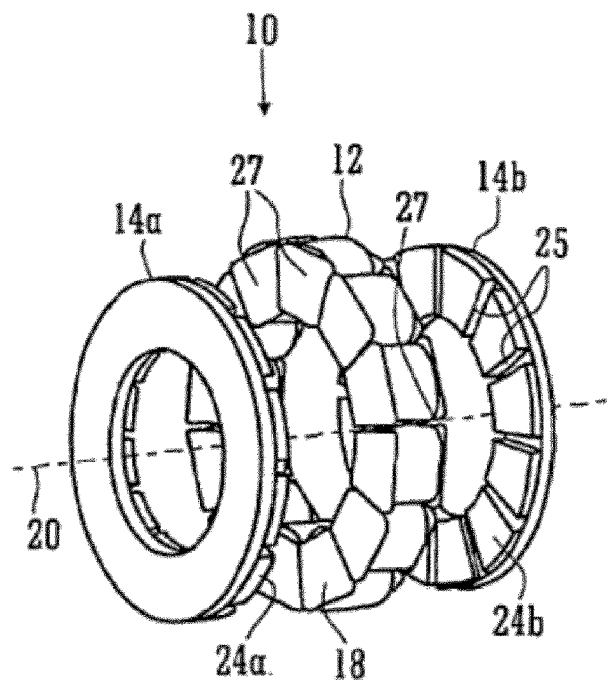
FIG. 2 shows a perspective view of the YASA machine of FIG. 1c.
Figure 3:
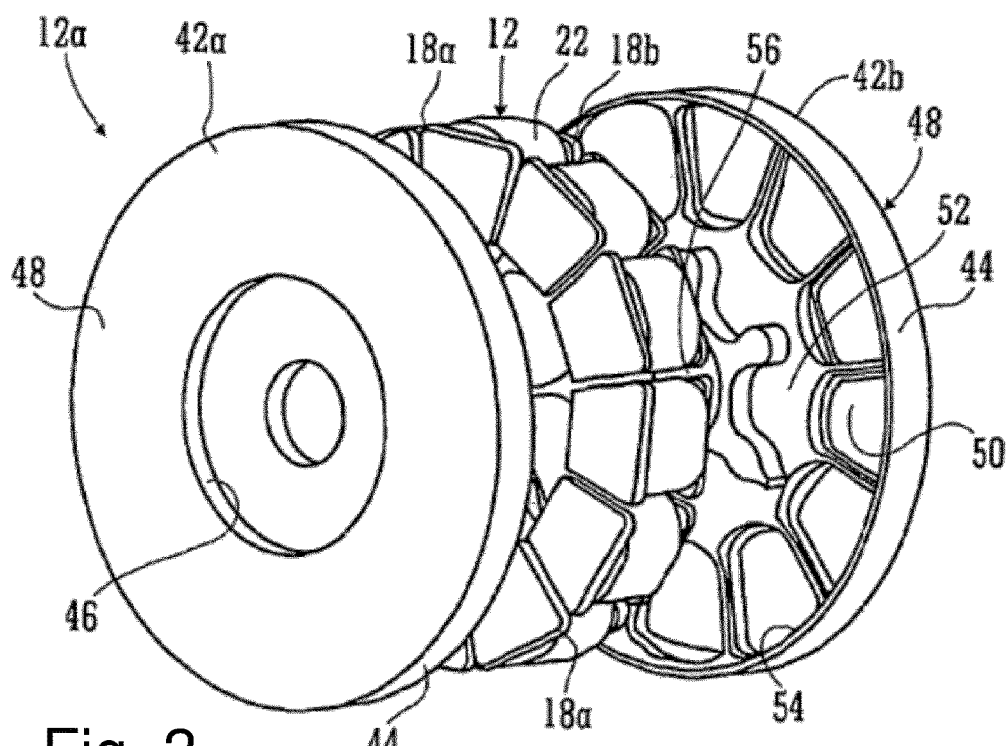
FIG. 3 shows a perspective exploded view of a stator and stator housing for a YASA machine.

We will first discuss the background of the arrangement of axial flux machines, which is an example use of the stator of the present invention. Referring first to FIGS. 1c, 2 and 3, which are taken from our PCT application WO2012/022974, FIG. 1c shows a schematic illustration of a yokeless and segmented armature machine 10.

The machine 10 comprises a stator 12 and two rotors 14a,b. The stator 12 is a collection of separate stator bars 16 spaced circumferentially about a rotation axis 20 of the rotors 14a,b. Each bar 16 has its own axis (not shown) which is preferably, but not essentially, disposed parallel to the rotation axis 20. Each end of each stator bar is provided with a shoe 18a,b which serves a physical purpose of confining a coil stack 22, which stack 22 is preferably of square/rectangular section insulated wire so that a high fill factor can be achieved. The coils 22 are connected to an electrical circuit (not shown) that, in the case of a motor, energizes the coils so that the poles of the resultant magnetic fields generated by the current flowing in the coils is opposite in adjacent stator coils 22.

The two rotors 14a,b carry permanent magnets 24a, b that face one another with the stator coil 22 between (when the stator bars are inclined—not as shown—the magnets are likewise). Two air gaps 26a,b are disposed between respective shoe and magnet pairs 18a/24a, 18b/24b. There are a number of coils and magnets spaced around the axis of rotation 20 and, preferably, there are a different number of coils and magnets so that the coils do not all come into registration with the corresponding magnet pair at the same time and at the same rotational position of the rotor with respect to the stator. This serves to reduce cogging.

In a motor the coils 22 are energized so that their polarity alternates serving to cause coils at different times to align with different magnet pairs, resulting in torque being applied between the rotor and the stator. The rotors 14a,b are generally connected together (for example by a shaft, not shown) and rotate together about the axis 20 relative to the stator 12. The magnetic circuit 30 is provided by two adjacent stator bars 16 and two magnet pairs 24a,b and a back iron 32a,b for each rotor links the flux between the back of each magnet 24a,b facing away from the respective coils 22. The stator coils 16 are enclosed within a housing that extends through the air gap 26a, b and which defines a chamber supplied with a cooling medium.

Turning to FIG. 3, a stator 12a is shown in which the stator coils are located between plastic material clam shells 42a, b. These clamshells have external cylindrical walls 44, internal cylindrical walls 46, and annular radially disposed walls 48. In the prior art example of FIG. 3 the radial walls 48 include internal pockets 50 to receive the shoes 18a,b of the stator bars 16 and serve to locate the stator coil assemblies 16, 22, 18a,b when the two clam shell housings 42a, b of the stator 12a are assembled together. The stator housing 42a, b defines spaces 52 internally of the coils 22 and externally at 54 around the outside of the coils 22 and there are spaces 56 between the coils. The spaces 52,54,56 are interlinked defining a cooling chamber. Although not shown in FIG. 3, when assembled, the stator housing 42a,b is provided with ports that allow cooling medium such as oil to be pumped into the spaces 52,54,56 to circulate around the coils and cool them.

Turning now to the present invention, the concept relates to the electrical interconnection of segmented armatures in YASA machines. Though fundamental to operation, electrical interconnects have not been seen as a source for significant power density improvement. However continued need for improved power density in machines has led to a surprising discovery that interconnects of armature coils coupled with dual purpose stator housings can significantly improve a YASA machine's power density.

In brief, the present invention provides a stator having a plurality of stator bars disposed circumferentially at intervals around an axis. Each of the stator bars has a set of windings wound therearound for generating a magnetic field generally parallel to the axis. A plurality of radially outwardly disposed electrical interconnects for connecting two or more windings together are provided radially outwardly of the plurality of stator bars and extending circumferentially along at least a portion of the outer periphery of the stator bars. A plurality of radially inwardly disposed electrical interconnects for connecting two or more windings together are also provided radially inwardly of the stator bars and extending circumferentially along at least a portion of the inner periphery of the stator bars. In the present invention, at least a portion of the outer periphery of the stator is devoid of radially outwardly disposed interconnects.

Figure 4:
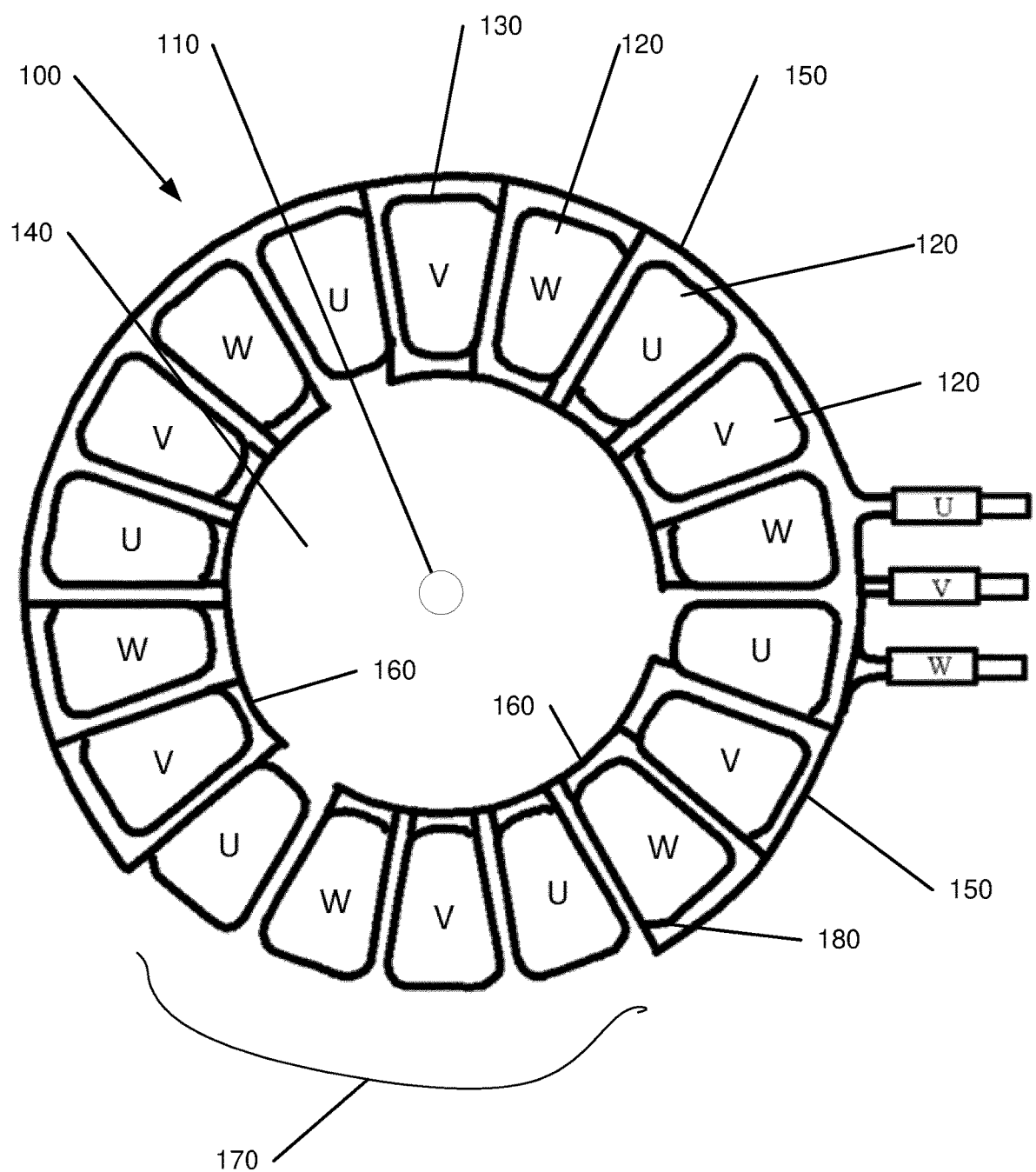
FIG. 4 shows a stator arrangement according to the present invention.

Turning now to the invention, FIG. 4 shows a simplified diagram of a stator 100 comprising a number of interconnected stator coil stacks/windings 130. Each set of windings is wound around a respective stator bar pole piece 120, which preferably has stator shoes (not shown) at either end to keep the coils 130 in place on the stator bar pole piece 120. This figure shows 18 stator bars 120, although the skilled reader would appreciate that this number could be greater or fewer than 18. When a current is passed through the windings 130, a magnetic field is created.

The stator bars 120 are arranged circumferentially at intervals about an axis 110, which is the axis of a machine using such a stator arrangement, about which a rotor would rotate relative to the stator 100. The stator bars 120 have an outer periphery facing away from the axis and an inner periphery facing towards the axis. The magnetic field produced by the windings 130 is generally parallel to the axis 110. The stator bars 120 are arrangement to provide a hollow region 140 at the centre of the stator.

With regards to the windings 130 themselves, they may be multiple layers of circular cross section coated wire. However the preferred arrangement for the windings 130 is to use a single layer of ribbon-shaped windings over the stator bar. The layer of windings comprises a ribbon-shaped wire having a greater width across a surface of the ribbon-shaped wire than thickness through the ribbon-shaped wire. The windings are stacked along the stator bar in a direction that is generally orthogonal to the axis such that adjacent ribbon-shaped wire surfaces of the ribbon-shaped wire abut one another.

In the arrangement shown, a three phase supply (UVW) is input to the stator coil windings 130. Each of the windings is interconnected either to a respective other winding 130 or to supply via a plurality of interconnects 150, 160. Some of the interconnects are disposed radially outwardly 150 of the stator bars 120, and extending circumferentially along at least a portion of the outer periphery of the stator bars 120. The interconnects may be positioned at different heights of the stator bars 120 and are maintained in position relative to the stator bars 120 by a plurality of clips (not shown) or spacers.

Also provided are a plurality of radially inward electrical interconnects 160. These are disposed radially inwardly of the stator bars and extend circumferentially along at least a portion of the inner periphery of the stator bars. As with the outward interconnects 150, the inward interconnects 160 may be positioned at different heights of the stator bars 120 and are maintained in position relative to the stator bars 120 by a plurality of clips (not shown) or spacers.

An interconnection between connected windings 130 may transition between the inner and outer periphery of the stator bars 120. In such a transition 180, this preferably occurs via a winding 130 itself. That is, the winding 130 is wound around the stator bar 130 such that the connection at one end of the winding 130 terminates at either the inner or outer periphery, and the connection at the other end of the winding 130 terminates at the outer or inner periphery respectively. Using the windings 130 to transition between one periphery and the other removes the need for additional interconnects that run between the two peripheries, and would result in an increase in the width (in the orientation of the height of the stator bar, that is between one pole shoe and the other) of the stator.

Of course, the windings 130 on the stator bars 120 may instead be wound to terminate at the same periphery, that is the input and output to the windings 130 may terminate either at the inner or outer periphery.

By careful consideration of the connection of the different windings 130, transitions 180 and interconnects 150, 160, a stator may be designed to have one or more portions 170 of the outer periphery of the stator bars 120 that is devoid of outwardly disposed electrical interconnects.

Figure 5:
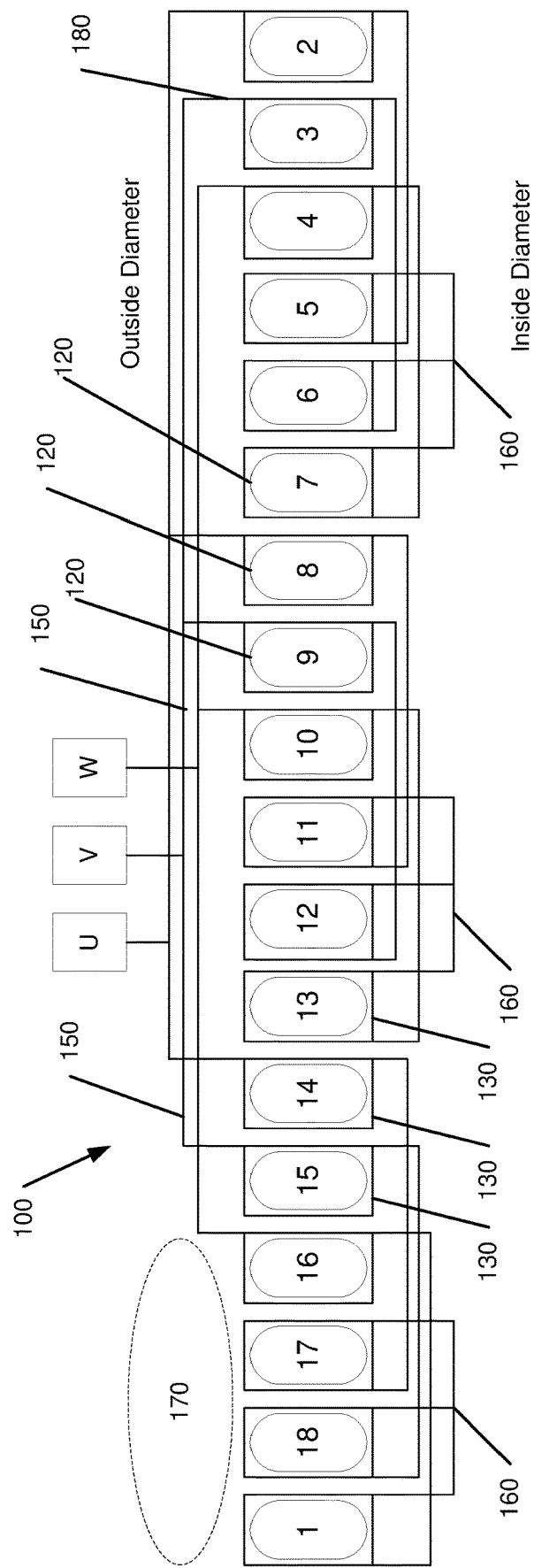
FIG. 5 shows an example electrical interconnection of stator coils.
Figure 6:
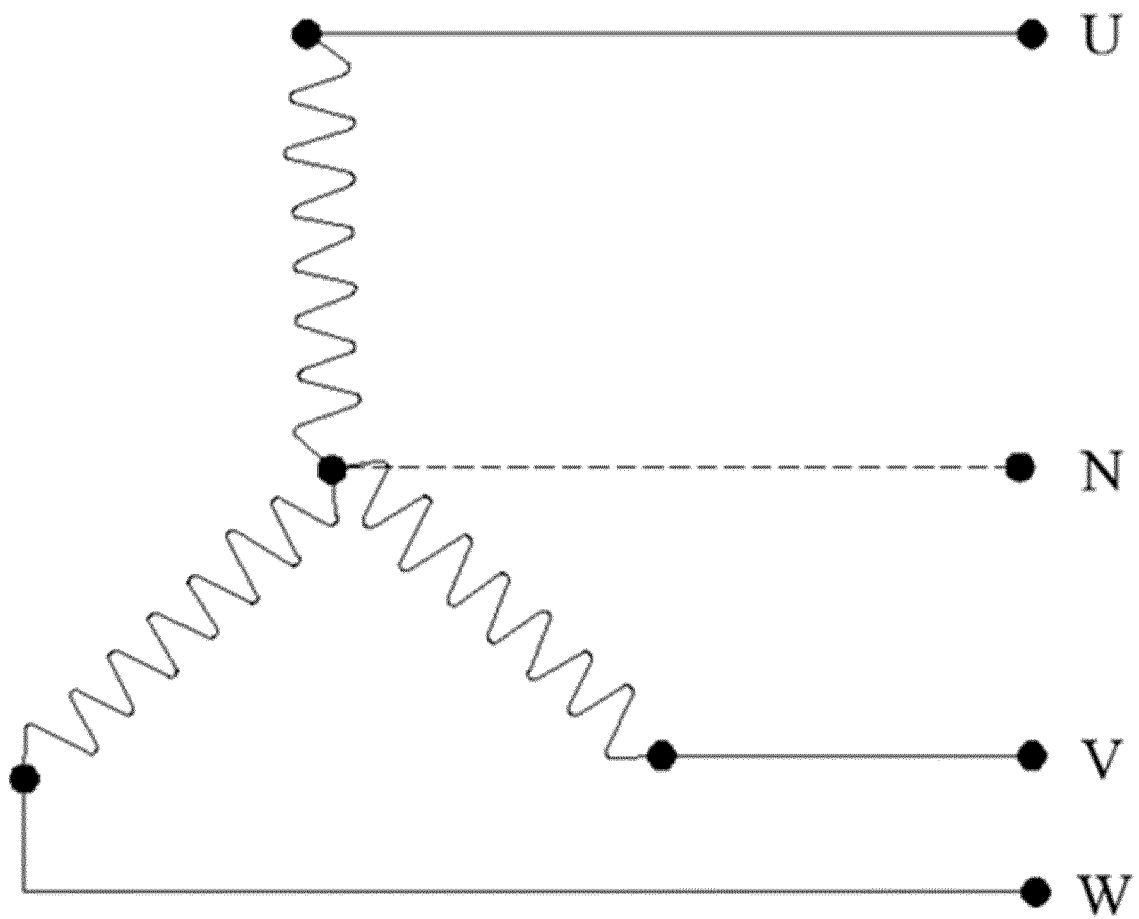
FIG. 6 shows a star arrangement.

FIG. 5 shows a simplified example connection scheme between all of the stator bars 120 and the power supplies UVW. As with FIG. 4, there are 18 stator bars in the example arrangement. In this example, the windings 130 are connected as a 3-phase star arrangement, although other connection schemes may be possible. For example, a delta arrangement may be used, or a delta-star arrangement, or other known arrangements may be used. FIG. 6 shows a simplified star configuration used in the present invention.

As with FIG. 4, the stator 100 comprises inwardly 160 and outwardly 150 disposed electrical interconnects. Transitions 180 between inner and outer peripheries of the stator bars 120 may occur via the windings 130 themselves. Furthermore, a region 170 that is devoid of outwardly disposed interconnects 150 is provided.

Figure 7:
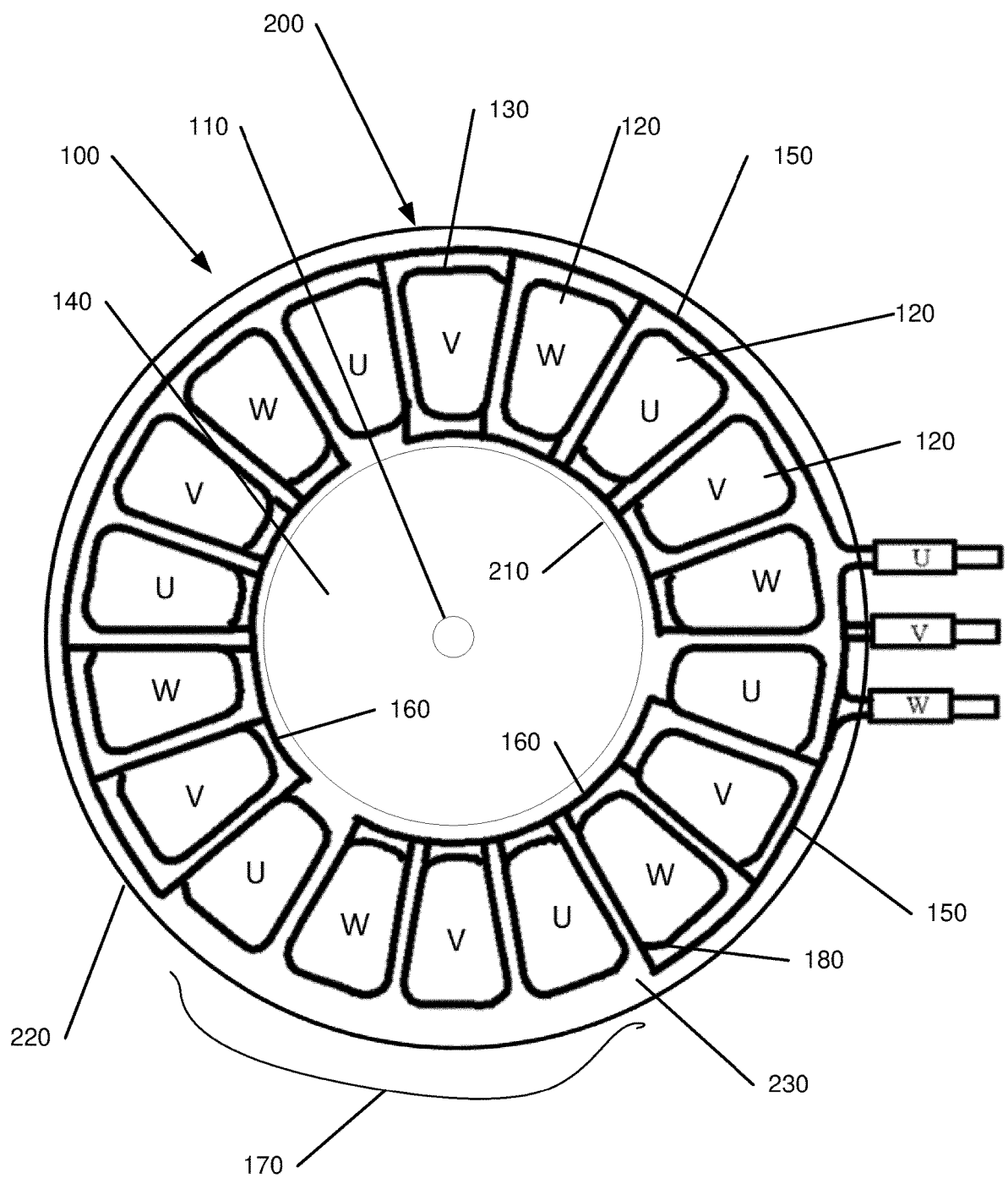
FIG. 7 shows a stator arrangement having a housing.
Figure 8:
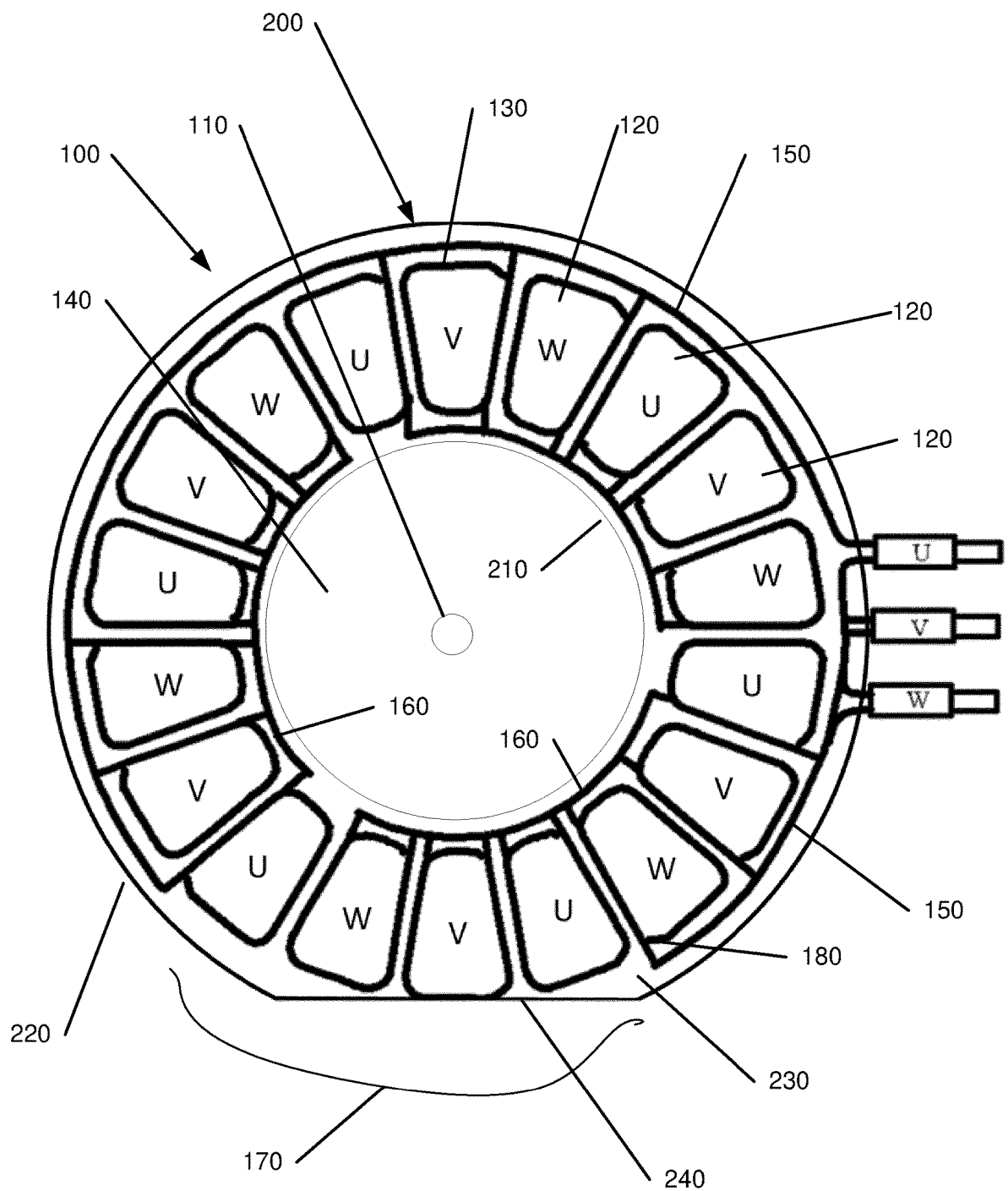
FIG. 8 shows a stator arrangement having a housing with a flattened portion.
Figure 9:
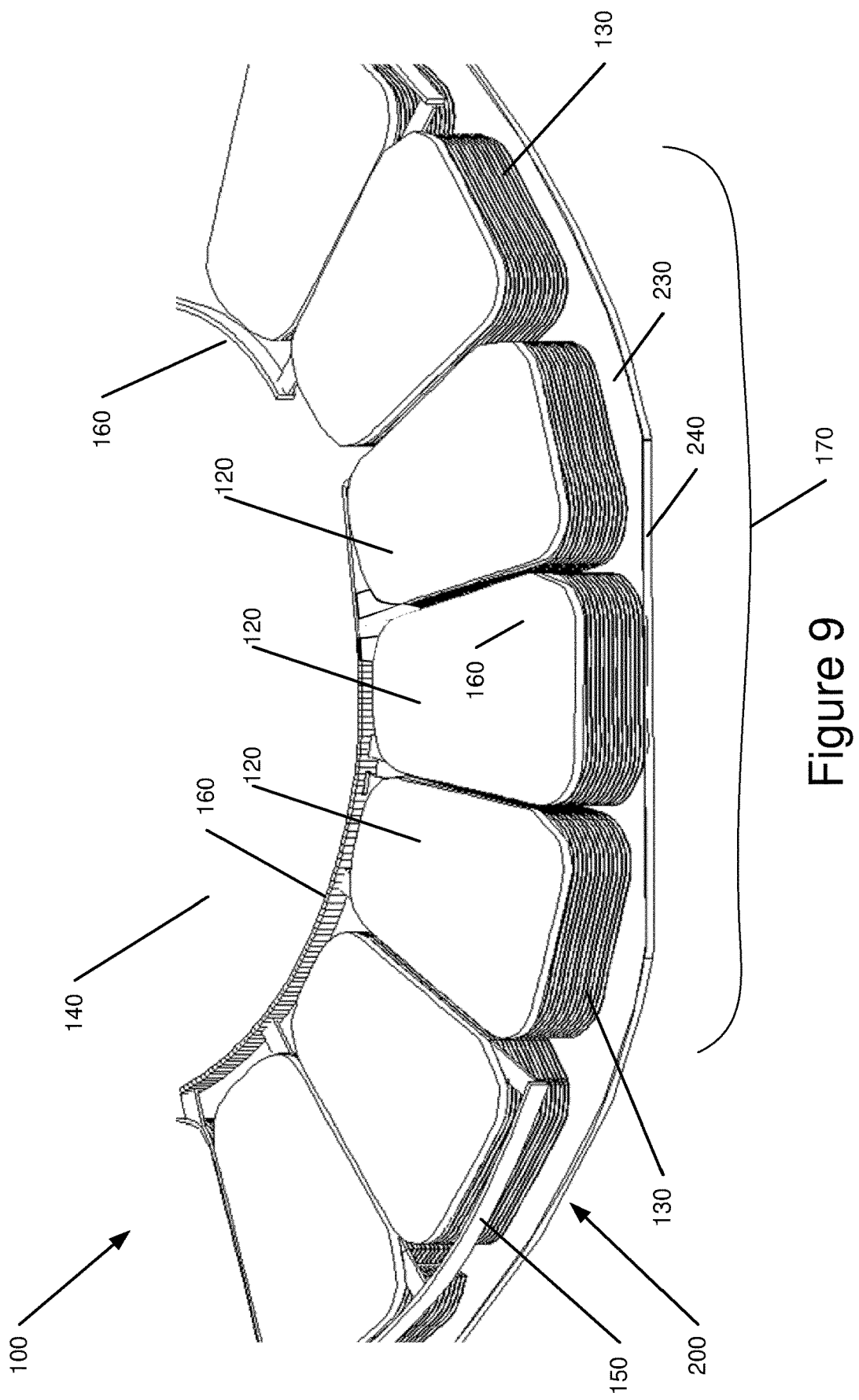
FIG. 9 shows a perspective view of the area devoid of outwardly disposed interconnects of the stator.

Advantages of such an arrangement will become apparent with reference to FIGS. 7, 8 and 9.

FIGS. 7 and 8 have the same arrangement of stator 100 and all the elements of FIG. 4, however, FIGS. 7 and 8 have a stator housing 200 that encloses the stator 100. The difference between FIGS. 7 and 8 is that FIG. 7 has a generally round housing 200, whereas the housing 200 of FIG. 8 comprises a flattened outer portion 240. FIG. 9 shows a perspective view of the arrangement of FIG. 8.

The stator housing 200, which encloses the stator bars 120 and interconnects 150, 160, has annular side walls 230 at either end of the stator bars 120 and an inner 210 and outer 220 circumferential sides respectively radially inwardly and radially outwardly of the stator bars 120. This arrangement of the housing 200 retains the hollow region 140 at the centre of the stator 100.

FIGS. 7 and 8 demonstrate an advantage of the arrangement of the stator of FIG. 4, that is in relation to the portion 170 devoid of outwardly disposed interconnects.

In relation to FIG. 7, for a given size of a housing 200, stator coils 130 and poles 120 on which they are wound may be increased in size, expanding into the region 170 free of outwardly disposed interconnect wiring 150 and thereby increasing the machine's maximum power output. Therefore, a machine using such a stator 100 would have a higher power output compared to a machine using a conventional stator of the same size.

In relation to FIGS. 8 and 9, instead of the housing 200 retaining the same shape as with FIG. 7, a portion 240 of the housing 200, corresponding with the region 170 of the stator devoid of outwardly disposed interconnects 150, has been flattened to reduce the dimension between the outer circumferential side wall 220 and the outer periphery of the stator bar 120. Such an arrangement advantageously provides for a stator that is diametrically smaller than a conventional stator. As such, a machine using the stator 100 of the present invention could be smaller than a machine using a conventional stator since the size of the stator bars 120 and windings 130 has not changed.

It may even be possible to combine the concepts of FIGS. 7 and 8, that is to provide a stator having bars 120 and coils 130 that are slightly larger and also a housing 200 that is slightly smaller where dimensions of the stator's 100 use will allow.

Figure 10:
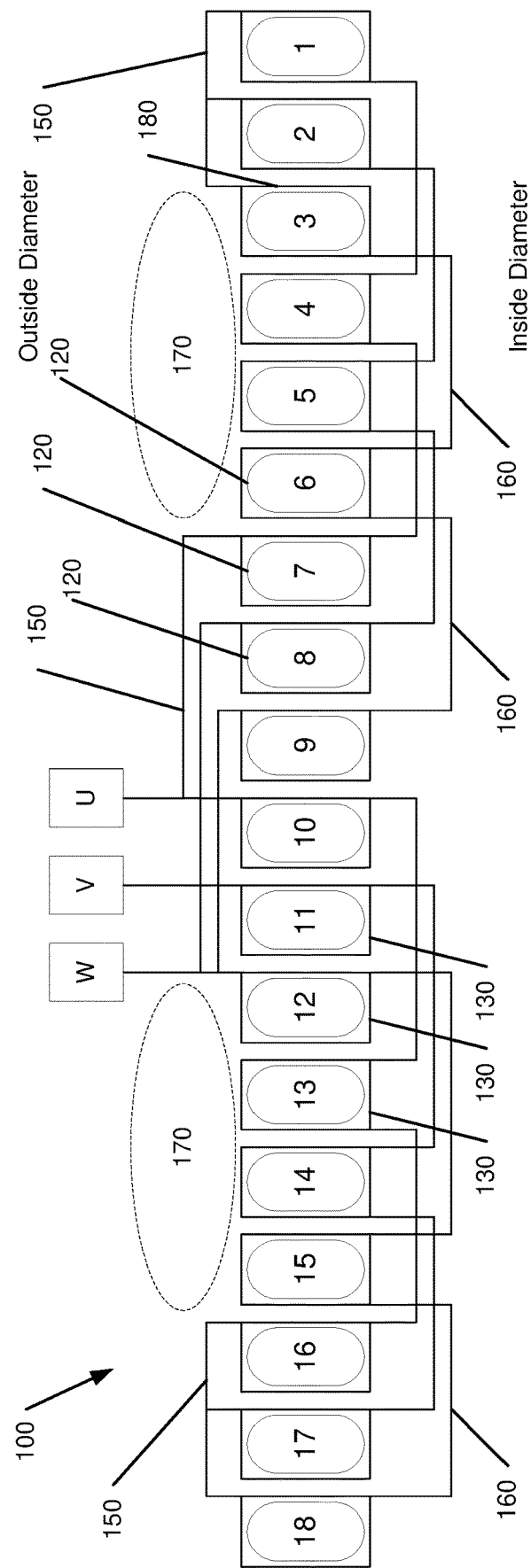
FIG. 10 shows an alternative example electrical interconnection of stator coils.

FIG. 10 shows an alternative example arrangement of the stator interconnects. As with FIG. 5, FIG. 10 shows a simplified example connection scheme between all of the stator bars 120 and the power supplies UVW. There are 18 stator bars in the example arrangement. In this example, the windings 130 are connected as a 3-phase star arrangement, although other connection schemes may be possible. For example, a delta arrangement may be used, or a delta-star arrangement, or other known arrangements may be used.

The stator 100 comprises inwardly 160 and outwardly 150 disposed electrical interconnects. Transitions 180 between inner and outer peripheries of the stator bars 120 may occur via the windings 130 themselves.

However, an advantage of this particular arrangement of interconnects is that two regions 170 that are devoid of outwardly disposed interconnects 150 are provided.

Figure 11:
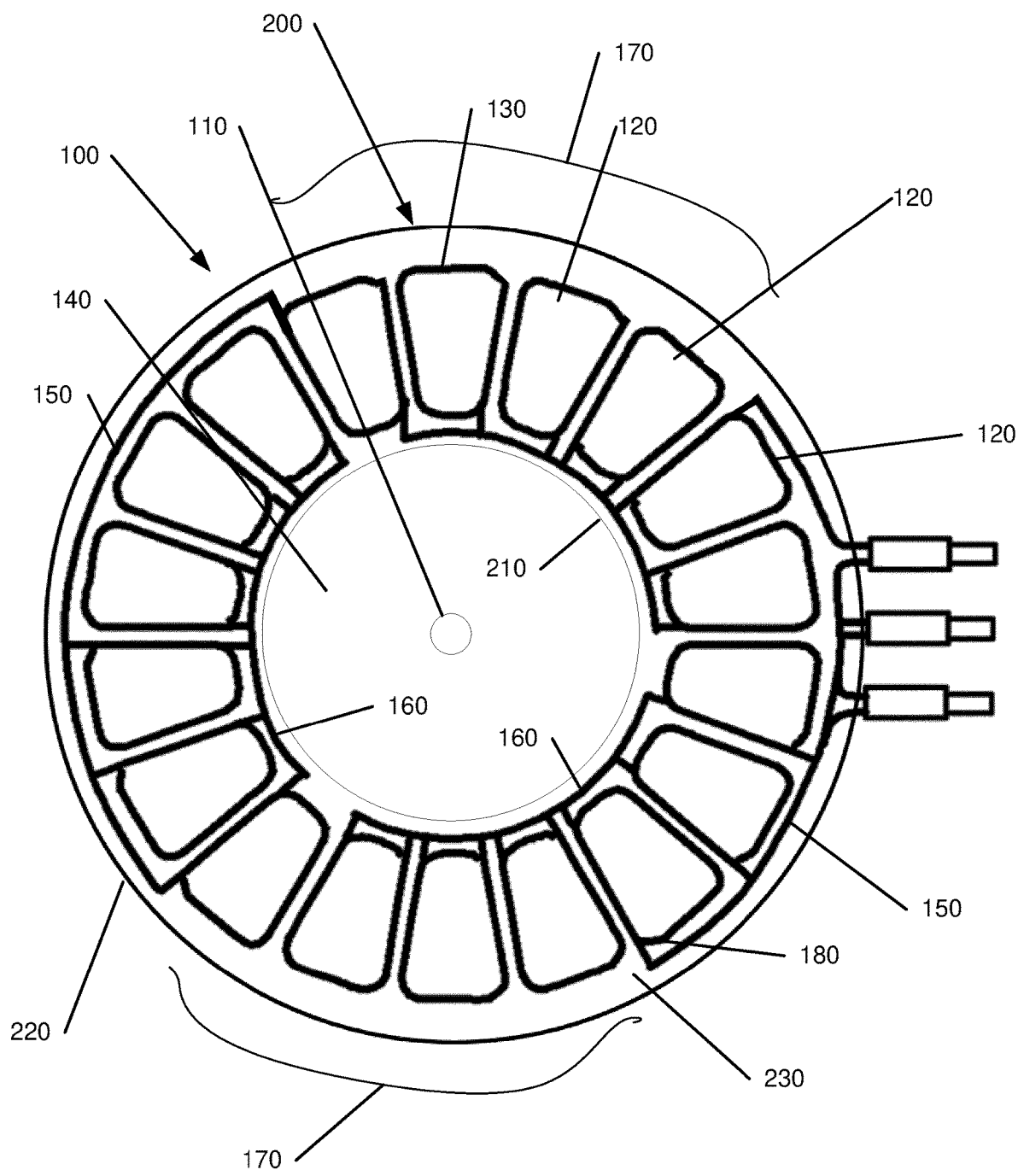
FIG. 11 shows a stator arrangement having a housing where there are two regions devoid of outwardly disposed interconnects.
Figure 12:
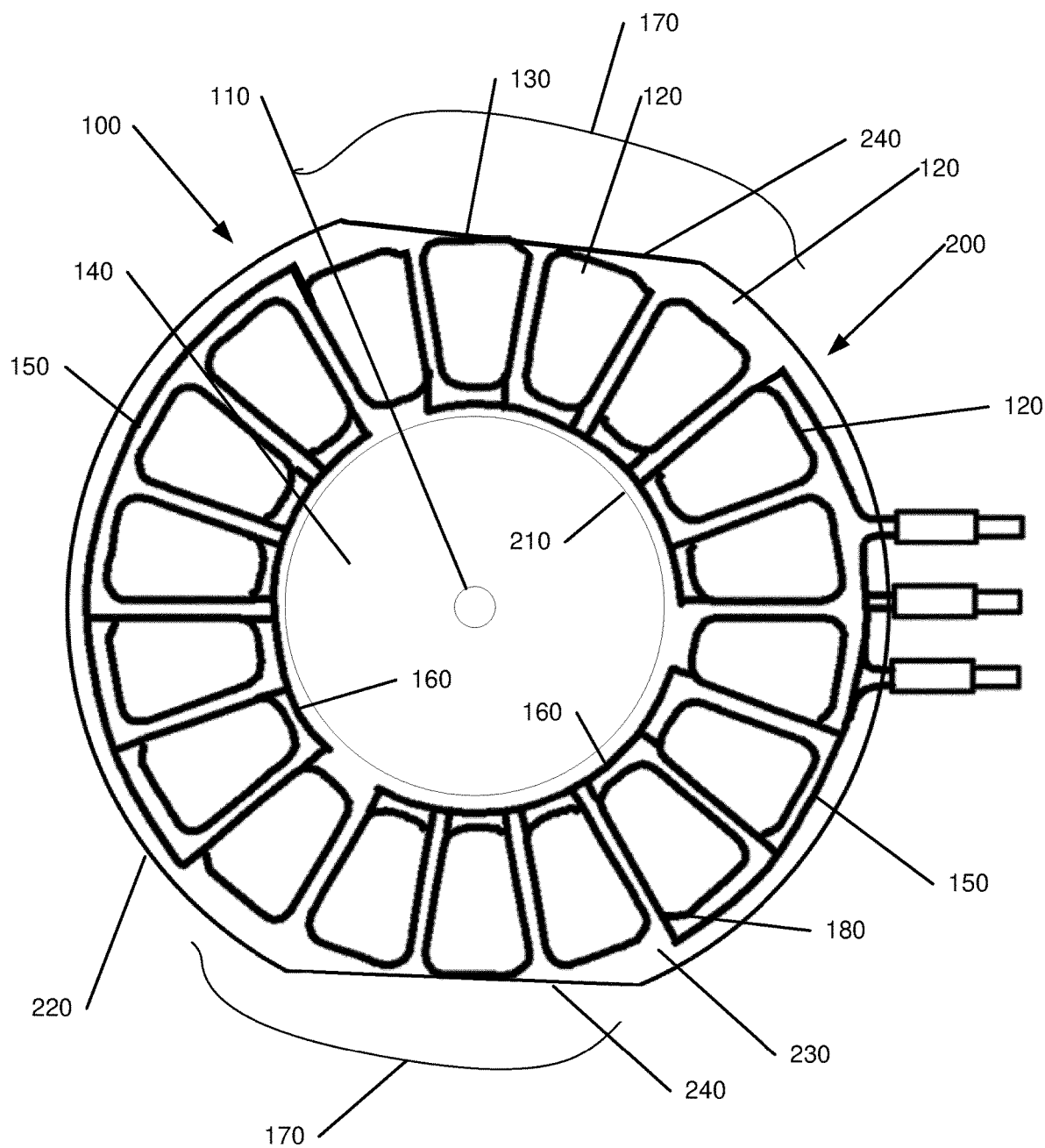
FIG. 12 shows a stator arrangement having a housing with two flattened portions.

FIGS. 11 and 12 have a similar arrangement of stator 100 and all the elements of FIG. 4, however, FIGS. 11 and 12 have a stator housing 200 that encloses the stator 100. The difference between FIGS. 11 and 12 is that FIG. 11 has a generally round housing 200, whereas the housing 200 of FIG. 12 comprises two flattened outer portions 240.

The stator housing 200, which encloses the stator bars 120 and interconnects 150, 160, has annular side walls 230 at either end of the stator bars 120 and an inner 210 and outer 220 circumferential sides respectively radially inwardly and radially outwardly of the stator bars 120. This arrangement of the housing 200 retains the hollow region 140 at the centre of the stator 100.

As with the examples shown with reference to FIGS. 7 to 9, the coils may be sized to fill the available space within the housing 200, thereby increasing the power output of the machine, or the housing may be sized smaller in order to reduce the outer dimensions of the machine, without reducing the power output of the machine. Or a combination of these two advantages may be used.

Whilst the two flattened portions 240 are shown opposite one another in FIG. 12, it may instead be possible to arrange the interconnects such that the flattened regions may be positioned at other angles circumferentially around the housing 200 relative to one another.

In any of the above examples, the housing 200 may also be configured and arranged to define a chamber that incorporates a cooling fluid. In such a case, the housing 200 also comprises a port for supply of the cooling fluid, and a port for drainage of the cooling fluid, which may be an oil or dielectric fluid. The cooling fluid flows around the cavity in the housing 200 to cool the coils.

The cooling fluid may flow in the outer periphery (that is between the outer circumferential side wall 220 of the housing 200 and the outer periphery of the stator bars 120), in the inner periphery (that is between the inner circumferential side wall 210 of the housing 200 and the inner periphery of the stator bars 120), and between adjacent stator bars 120. Allowing the cooling fluid to flow in all of these passages within the housing provides a cooling solution that is efficient and very effective.

Blocks (not shown) may also be provided within the cavity, located between the inner circumferential side wall 210 and a stator bar 120, or between the outer circumferential side wall 220 and a stator bar 120. The purpose of the blocks is to block the respective radially inner or radially outer cooling fluid flow path and force the cooling fluid to flow between adjacent stator bars 120 and transition to the other cooling fluid flow path. By placing the blocks throughout the cavity, the cooling fluid may be caused to meander its way through the cavity (that is transition between the outer and inner cooling fluid flow paths) as it flows from the inlet to the outlet. This greatly increases the cooling performance of the stator.

In the configuration of the housing 200 shown in FIGS. 8, 9 and 12, the flattened portions 240 of the housing 200 itself may perform the function of a block to the cooling fluid flow path. If the flattened portions 240 are dimensioned appropriately in relation to the corresponding stator bars 120, the housing may block the cooling fluid and force the cooling fluid between adjacent stator bars 120, that is to transition from the outer circumferential path between the outer circumferential wall 220 of the housing 200 and stator bars 120 to the inner circumferential path between the inner circumferential wall 210 and the stator bars 120.

The stator 100 may be used in the formation of an electrical machine, such as a motor or generator. In such machines, a rotor, comprising a set of permanent magnets, is mounted for rotation about the axis of the machine. The rotor is spaced apart from the stator 100 along the axis of the machine to define a gap between the stator 100 and rotor. In a double rotor configuration, a second rotor may be mounted on a side of the stator 100 opposing the first rotor, and mounted for rotation about the axis relative to the stator 100. The first and second rotors may be tied together, or may operate independently.

As mentioned above, such electric machines of the types described herein may be capable of converting mechanical energy to electrical energy and/or vice versa. When operating to convert mechanical energy to electrical energy these machines are operating as generators. When operating to convert electrical energy to mechanical energy these machines are operating as motors. A single electric machine may be capable of performing both functions.

No doubt many other effective alternatives will occur to the skilled person. It will be understood that the invention is not limited to the described embodiments and encompasses modifications apparent to those skilled in the art lying within the scope of the claims appended hereto.

The invention claimed is:

1. A stator for an axial flux machine, comprising:
a plurality of stator bars disposed circumferentially at intervals around an axis, each of the stator bars having a set of windings wound therearound to form a stator coil stack for generating a magnetic field generally parallel to the axis, the plurality of stator coil stacks being arranged to provide a hollow region at the centre of the axis, the stator coil stacks having an outer periphery radially facing away from the axis and an inner periphery radially facing towards the axis;
a plurality of radially outwardly disposed electrical interconnects, each of which respectively connect the outer periphery of two or more windings together, the plurality of radially outwardly disposed electrical interconnects being disposed radially outwardly of the outer periphery of the plurality of stator coil stacks and extending circumferentially along at least a portion of the outer periphery of the stator coil stacks; and
a plurality of radially inwardly disposed electrical interconnects, each of which respectively connect the inner periphery of two or more windings together, the plurality of radially inwardly disposed electrical interconnects being disposed radially inwardly of the inner periphery of the stator coil stacks and extending circumferentially along at least a portion of the inner periphery of the stator coil stacks,
wherein the outer periphery of the stator is devoid of radially outwardly disposed interconnects along only one or more portions.

2. The stator according to claim 1, wherein the radially inwardly portion of the stator, corresponding to the one or more portions devoid of radially outwardly disposed interconnects, comprises radially inwardly disposed electrical interconnects.

3. The stator according to claim 1, comprising one or more electrical transitions between the radially inwardly and radially outwardly electrical interconnects.

4. The stator according to claim 3, wherein each of the one or more transitions between the radially inwardly and radially outwardly electrical interconnects occurs via a respective winding.

5. The stator according to claim 1, wherein each set of windings comprises a single layer of windings over the stator bar, the layer of windings comprising a ribbon-shaped wire having a greater width across a surface of the ribbon-shaped wire than thickness through the ribbon-shaped wire;
wherein the windings are stacked along the stator bar in a direction that is generally orthogonal to the axis such that adjacent ribbon-shaped wire surfaces of said ribbon-shaped wire abut one another.

6. The stator according to claim 1, wherein the windings of the stator coil stacks are electrically connected in a 3-phase star arrangement.

7. The stator according to claim 1, comprising a stator housing enclosing the stator coil stacks, the stator housing having annular side walls at either end of the stator bars and an inner and outer circumferential sides respectively radially inwardly and radially outwardly of the stator coil stacks.

8. The stator according to claim 7, wherein one or more portions of the stator housing corresponding with the respective one or more portions of the outer periphery of the stator that is devoid of radially outwardly disposed interconnects has a dimension between the outer circumferential side and the stator bar that is smaller than a dimension between the outer circumferential side and stator bar at a region of the stator comprising radially outwardly disposed interconnects.

9. The stator according to claim 7, wherein the housing defines a chamber incorporating a cooling fluid, the stator housing including a port for supply and a port for drainage of the cooling fluid.

10. The stator according to claim 9, wherein the housing and stator bars are arranged to permit the cooling fluid to flow back and forth between the inner and outer radius of the stator bars.

11. The stator according to claim 10, wherein the stator comprises one or more blocks disposed in the stator housing between the stator housing and one or more respective stator bars,
wherein the cooling fluid is forced through gaps between the stator bars by means of the blocks.

12. The stator according to claim 11, wherein the outer circumferential side of the housing abuts one or more stator bars in the regions of the stator corresponding with the respective one or more portions of the outer periphery of the stator that is devoid of radially outwardly disposed interconnects, the abutment blocking flow of the cooling liquid between the housing and the stator bar and causing the cooling fluid to be forced between adjacent stator bars.

13. The stator according to claim 1, wherein there are two portions devoid of radially outwardly disposed interconnects.

14. The stator according to claim 13, wherein, the two portions devoid of radially outwardly disposed interconnects are circumferentially opposite one another.

15. An axial flux machine, comprising:
a stator comprising a plurality of stator bars disposed circumferentially at intervals around an axis, each of the stator bars having a set of windings wound therearound to form a stator coil stack for generating a magnetic field generally parallel to the axis, the plurality of stator coil stacks being arranged to provide a hollow region at the centre of the axis, the stator coil stacks having an outer periphery radially facing away from the axis and an inner periphery radially facing towards the axis;
a rotor comprising a set of permanent magnets and mounted for rotation about the axis of the machine, the rotor being spaced apart from the stator along the axis of the machine to define a gap between the stator and rotor,
wherein the stator comprises:
a plurality of radially outwardly disposed electrical interconnects, each of which respectively connect the outer periphery of two or more windings together, the plurality of radially outwardly disposed electrical interconnects being disposed radially outwardly of the outer periphery of the plurality of stator bars and extending circumferentially along at least a portion of the outer periphery of the stator coil stacks; and
a plurality of radially inwardly disposed electrical interconnects, each of which respectively connect the inner periphery of two or more windings together, the plurality of radially inwardly disposed electrical interconnects being disposed radially inwardly of the inner periphery of the stator coil stacks and extending circumferentially along at least a portion of the inner periphery of the stator coil stacks, and
wherein the stator is devoid of radially outwardly disposed interconnects along only one or more portions.

16. The machine according to claim 15, wherein the radially inwardly portion of the stator, corresponding to the one or more portions devoid of radially outwardly disposed interconnects, comprises radially inwardly disposed electrical interconnects.

17. The machine according to claim 15, comprising one or more electrical transitions between the radially inwardly and radially outwardly electrical interconnects.

18. The machine according to claim 17, wherein each of the one or more transitions between the radially inwardly and radially outwardly electrical interconnects occurs via a respective winding.

19. The machine according to claim 15, wherein each set of windings comprises a single layer of windings over the stator bar, the layer of windings comprising a ribbon-shaped wire having a greater width across a surface of the ribbon-shaped wire than thickness through the ribbon-shaped wire;
wherein the windings are stacked along the stator bar in a direction that is generally orthogonal to the axis such that adjacent ribbon-shaped wire surfaces of said ribbon-shaped wire abut one another.

20. The machine according to claim 15, wherein the windings of the stator coil stacks are electrically connected in a 3-phase star arrangement.

21. The machine according to claim 15, comprising a stator housing enclosing the stator coil stacks, the stator housing having annular side walls at either end of the stator bars between the stator and the rotor and an inner and outer circumferential sides respectively radially inwardly and radially outwardly of the stator coil stacks.

22. The machine according to claim 21, wherein one or more portions of the stator housing corresponding with the respective one or more portions of the outer periphery of the stator that is devoid of radially outwardly disposed interconnects has a dimension between the outer circumferential side and the stator bar that is smaller than a dimension between the outer circumferential side and stator bar at a region of the stator comprising radially outwardly disposed interconnects.

23. The machine according to claim 21, wherein the housing defines a chamber incorporating a cooling fluid, the stator housing including a port for supply and a port for drainage of the cooling fluid.

24. The machine according to claim 23, wherein the housing and stator coil stacks are arranged to permit the cooling fluid to flow back and forth between the inner and outer radius of the stator coil stacks.

25. The machine according to claim 24, wherein the stator comprises one or more blocks disposed in the stator housing between the stator housing and one or more respective stator coil stacks, wherein the cooling fluid is forced through gaps between the stator coil stacks by means of the blocks.

26. The machine according to claim 25, wherein the outer circumferential side of the housing abuts one or more stator coil stacks in the regions of the stator corresponding with the respective one or more portions of the outer periphery of the stator that is devoid of radially outwardly disposed interconnects, the abutment blocking flow of the cooling liquid between the housing and the stator coils stack and causing the cooling fluid to be forced between adjacent stator coil stacks.

27. The machine according to claim 15, comprising a second rotor comprising a set of permanent magnets and mounted for rotation about the axis of the machine, the second rotor being spaced apart from the stator along the axis of the machine to define a gap between the stator and second rotor, and the second rotor being disposed on a side of the stator opposed to the rotor.

28. The machine according to claim 15, wherein there are two portions devoid of radially outwardly disposed interconnects.

29. The machine according to claim 28, wherein the two portions devoid of radially outwardly disposed interconnects are circumferentially opposite one another.

30. The machine according to claim 15, wherein the machine is a motor or a generator.

\* \* \* \* \*